Patented Apr. 4, 1950

2,502,565

UNITED STATES PATENT OFFICE 2,502,565

ISOMERIZATION PROCESS

James Hoekstra, Chicago, Ill., assignor to Universal Oil Products Company, Chicago, Ill., a corporation of Delaware No Drawing. Application December 14, 1946, Serial No. 716,435

2 Claims. (Cl. 260—683.2)

This invention relates to the isomerization of olefins in the presence of a novel catalyst and under selected conditions of operation.

While the invention is applicable to the isomerization of normal butene, particularly the conversion of butene-1 to butene-2, and also the conversion of normal butene to isobutene, it is particularly adapted to the treatment of olefinic hydrocarbons in the gasoline boiling range in order to increase the octane number thereof, in the type of process now referred to in the art as "isoforming."

One of the distinguishing features of the isoforming process is the use of high weight hourly space velocities (defined as weight of oil per hour per weight of catalyst in the reaction zone). With these high space velocities, cracking reactions (splitting of carbon to carbon bonds) occur to only a limited extent and accordingly high liquid recoveries are obtained. The increase in octane number generally varies from about 3 to about 10 units but this increase is of considerable importance in certain cases where it is desired to increase the octane number of an olefinic gasoline from 68 to 72 or more, or when it is desired to increase the octane number of thermally cracked gasoline from 72-76 to 80 or more so that it will be competitive with gasolines produced by catalytic cracking operations.

It is believed that the principal reaction occurring in the isoforming process is the isomerization of olefins having double bonds adjoining the terminal carbon atoms toward the center of the olefin molecule, with a consequent increase in octane number. In addition to the shift in the position of the double bond, branching of the olefinic hydrocarbons undoubtedly takes place. The conditions of operation are so selected that the amount of cracking and polymerization is kept to a minimum.

In a broad aspect the present invention relates to a process for the isomerization of an olefin hydrocarbon containing at least 4 carbon atoms to the molecule which comprises treating said olefin at isomerizing conditions with a catalyst comprising a cracking component composited with magnesium chromate.

In a specific embodiment the present invention relates to an isoforming process which comprises treating thermally cracked gasoline at isoforming conditions with a catalyst comprising silica-alumina composited with magnesium chromate.

In accordance with the invention, a cracking component such as silica-alumina, silica-zirconia, silica-alumina-zirconia, silica-magnesia, silica-alumina-magnesia, etc., is composited with magnesium chromate. The cracking components hereinbefore set forth are synthetically prepared and may be manufactured by any suitable method including separate, successive, or co-precipitation methods. When the cracking component contains alkali metal ions, as in the case of silica or silica-metal oxide mixtures produced from water glass solutions containing sodium, the silica or the cracking composite must be treated to remove the alkali metal ions. A particularly suitable method for removing sodium ions is to wash the silica or cracking composite with acidulated water, following which the cracking component may be dried at temperatures of from about 200° to about 500° F. for a period of from 2 to 20 hours and/or calcined at a temperature of from about 500° to about 1200° F. for a period of from about 2 to about 12 hours. In place of synthetically prepared cracking composites, certain active naturally occurring materials may be employed such as Super-Filtrol, acid treated montmorillonite, etc., but not necessarily with equivalent results.

The cracking component, prepared in a manner hereinbefore set forth, either with or without prior drying and/or calcining, may be composited with magnesium chromate in any suitable manner. One particularly suitable method is to admix a solution of magnesium chromate ($Mg.Cr.O_4 \cdot 7H_2O$) with the cracking component, followed by drying and calcining under substantially the same conditions as hereinbefore set forth. The amount of magnesium chromate to be employed may be varied over wide limits and, in general, will be within the range of from about 10 to about 50% by weight of the total composite.

It is understood that the olefinic gasoline to be treated in accordance with the present invention may comprise full boiling range gasoline or any selected fraction thereof. Usually the selected fraction will comprise the higher boiling fraction of gasoline, generally referred to as naphtha and generally having an initial boiling point within the range of 200° to 300° F. and an end boiling point within the range of 350° to 450° F. A desired combination process of this nature comprises fractionating an olefinic gasoline to separate a light fraction consisting of 10 to 60% by volume of the gasoline and a heavy fraction consisting of the remainder thereof, subjecting the heavy fraction to isoforming in accordance with the teachings of the present invention, and then blending the isoformed products with the previously separated light fraction.

As hereinbefore set forth the weight hourly space velocity is generally high and will be in the range of from about 5 to about 50 and preferably 10 to 40. The temperature to be employed is within the range of from about 800° to about 1100° F. and the pressure is generally moderately superatmospheric up to 100 pounds or more.

The process of the present invention may be effected in any suitable equipment, a preferred arrangement being the fixed bed type process in which the catalyst is disposed in a reaction zone and the olefin hydrocarbons passed thereover at the desired temperature, pressure and time, in either upward or downward flow. Fluidized, moving bed or suspensoid type operations may also be employed when desired. The products may they be fractionated to separate the small amount of gases formed in the process, and the normally liquid products may be further separated into gasoline of the desired end boiling point and any higher boiling products which may be present.

After a period of service, the catalyst may be regenerated by burning carbonaceous deposits therefrom by means of air or other suitable oxygen-containing gas.

The following example is introduced to further illustrate the novelty and utility of the present invention, but not with the intention of unduly limiting the same.

Catalyst A comprises a silica-alumina cracking composite and was prepared by adding hydrochloric acid to commercial water glass in proportions to precipitate silica hydrogel. The silica hydrogen was admixed with aluminum chloride and ammonium hydroxide was added to precipitate alumina. The resulting silica-alumina hydrogel was subsequently dried at 250° F. and washed with acidulated water to remove sodium ions. The washed composite was then dried at a temperature of 250° F. and calcined at a temperature of 1112° F. for 2 hours.

Catalyst B comprises a catalyst prepared in accordance with the teachings of the present invention. A portion (100 grams) of the silica-alumina composite prepared in the manner hereinbefore set forth was treated with a solution of 58.8 grams of magnesium chromate

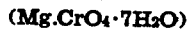
$(Mg.CrO_4 \cdot 7H_2O)$ in 80 ml. of water. The wet mixture was then dried at 250° F. for 16 hours and calcined at 1112° F. for 2 hours.

A thermally cracked gasoline having an A. S. T. M. octane number of 67.9 was vaporized and passed over the catalysts at a temperature of 932° F. and an hourly weight space velocity of approximately 11.5. The results of these runs are shown in the following table.

|  | Catalyst A | Catalyst B |
|---|---|---|
| Liquid Yield, Vol.-Per Cent of Charge | 90.0 | 98.0 |
| Gas, Wt.-Per Cent of Charge | 9.8 | 1.2 |
| Carbon, Wt.-Per Cent of Charge | .19 | .31 |
| A. S. T. M. Octane Number of Product | 72.4 | 72.4 |

It will be noted from the above table that Catalyst B containing magnesium chromate effected the same increase in octane number but that the loss was only 2% as compared against a 10% loss for Catalyst A. If the two catalysts are used under conditions to yield the same liquid recoveries, Catalyst B will effect a greater improvement in octane number than obtained with Catalyst A.

I claim as my invention:

1. A process for increasing the octane number of thermally cracked gasoline by isomerization of olefins contained therein, with a minimum of cracking, which comprises subjecting said gasoline, at a temperature of from about 800° F. to about 1100° F. and an hourly weight space velocity of from about 5 to about 50, to the action of a catalyst comprising magnesium chromate, silica and a metal oxide selected from the group consisting of alumina, zirconia and magnesia.

2. A process for increasing the octane number of thermally cracked gasoline by isomerization of olefins contained therein, with a minimum of cracking, which comprises subjecting said gasoline, at a temperature of from about 800° F. to about 1100° F. and an hourly weight space velocity of from about 5 to about 50, to the action of a catalyst comprising magnesium chromate, silica and alumina.

JAMES HOEKSTRA.

REFERENCES CITED

The following references are of record in the file of this patent:

UNITED STATES PATENTS

| Number | Name | Date |
|---|---|---|
| 2,331,338 | Michael et al. | Oct. 12, 1943 |
| 2,377,352 | Mattox | June 5, 1945 |
| 2,389,406 | Bloch et al. | Nov. 20, 1945 |
| 2,404,340 | Zimmerman | July 16, 1946 |
| 2,426,118 | Parker et al. | Aug. 19, 1947 |